(12) United States Patent
Reial

(10) Patent No.: US 6,917,904 B1
(45) Date of Patent: Jul. 12, 2005

(54) METHOD OF AND APPARATUS FOR PATH-SEARCHER WINDOW POSITIONING

(75) Inventor: Andres Reial, Lund (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 10/755,803

(22) Filed: Jan. 12, 2004

(51) Int. Cl.$^7$ .............................................. G06F 15/00
(52) U.S. Cl. ...................................................... 702/199
(58) Field of Search .............................. 702/60–65, 94, 702/95, 150, 199; 342/450, 458; 375/148, 342, 347, 350

(56) References Cited

U.S. PATENT DOCUMENTS

| | | | |
|---|---|---|---|
| 6,370,397 B1 | 4/2002 | Popovic et al. | |
| 6,510,143 B1 | 1/2003 | Bejjani et al. | |
| 2001/0033603 A1 | 10/2001 | Olaker | |
| 2002/0003791 A1 * | 1/2002 | Hayata | 370/342 |
| 2002/0168034 A1 * | 11/2002 | Yang et al. | 375/342 |
| 2003/0086512 A1 | 5/2003 | Rick et al. | |
| 2004/0052304 A1 * | 3/2004 | Reial | 375/148 |
| 2004/0095957 A1 | 5/2004 | Zhao et al. | |

FOREIGN PATENT DOCUMENTS

| | | |
|---|---|---|
| EP | 1041729 | 10/2000 |
| EP | 1065801 | 1/2001 |
| EP | 1 276 248 A1 | 1/2003 |
| WO | WO 00/69090 | 11/2000 |
| WO | WO 01/18985 A1 | 3/2001 |
| WO | WO 01/76088 A2 | 10/2001 |
| WO | WO 02/80423 | 10/2002 |

OTHER PUBLICATIONS

"First Arrival Detection for Positioning in Mobile Channels", by Jativa et al.. IEEE 2002.*
"A Reconfigurable, Power–Scalable Rake Receiver IP for W–CDMA", by Bianco et al.. IEEE 2003; pp 499–502.*
"PN Code Acquisition with Adaptive Antenna Array and Adaptive Threshold for DS–CDMA Wireless Communications", by Wang et al.. IEEE 2003.*
"A New Combined Architecture for CDMA Location Searchers and Rake Receivers"; by Nabil R. Yousef et al.; Adaptive and Nonlinear Systems Laboratory Electrical Engineering Department; University of California, Los Angeles, CA; Published in Proc. International Symposium on Circuits and Systems (ISCAS), Geneva, Switzerland, May 2000; 11 pages.
"Path Searchers for a WCDMA Rake Receiver"; by Kim–Chayan Gan; Motorola Intelligence Everywhere; pp. 1–17. Mar. 2002.

* cited by examiner

Primary Examiner—Michael Nghiem
(74) Attorney, Agent, or Firm—Jenkens & Gilchrist, P.C.

(57) ABSTRACT

An average position estimate is determined using an instantaneous position estimate, a previously-determined average position estimate, a previously-determined average signal power, and an instantaneous signal power. The average signal power is determined using the previously-determined average signal power and the instantaneous signal power.

21 Claims, 1 Drawing Sheet

METHOD OF AND APPARATUS FOR PATH-SEARCHER WINDOW POSITIONING

CROSS-REFERENCE TO RELATED APPLICATIONS

This patent application incorporates by reference the entire disclosure of a U.S. patent application Ser. No. 10/755,760 entitled Method of and Apparatus for Computation of Unbiased Power Delay Profile, and filed on the same date as this patent application.

BACKGROUND OF THE INVENTION

BACKGROUND

1. Technical Field

The invention relates to digital wireless communications systems in which delays of individual multi-path components of a time-varying fading channel are to be estimated. The digital wireless communications systems may include, for example, systems using Code Division Multiple Access (CDMA) RAKE receivers and, more particularly, systems using receivers that operate in fading environments and have limited processing resources, such as Wideband CDMA (WCDMA) receivers.

2. History of Related Art

In wireless communications, a physical channel between a transmitter and a receiver is formed via a radio link. In most cases, no antenna of the transmitter is narrowly focused towards the receiver. In addition to a possible direct path, many other propagation paths often exist between the transmitter and the receiver. The other propagation paths typically result from reflections from objects near the transmitter or the receiver. Rays with similar propagation distances combine at the receiver, depending on an instantaneous phase relationship, and form a distinct multi-path component. The effect of a combination of the rays depends on the instantaneous phase relationship of a carrier wavelength and also on distance differences among the rays. In the case of destructive interference, the combination of the rays leads to a significant decrease in path-gain magnitude (i.e., fading).

Performance of a CDMA receiver is improved if signal energy carried by many multi-path components is utilized. A desired improvement in CDMA receiver performance may be achieved via a RAKE receiver. In the RAKE receiver, each of a plurality of multi-path components is assigned a despreader (i.e., RAKE finger). Each of the plurality of despreaders is assigned a reference copy of a spreading code. Each of the spreading-code reference copies is delayed in time by an amount equal to a path delay of a corresponding multi-path component. Outputs of the respective despreaders are then coherently combined via a RAKE combiner to produce a symbol estimate.

The RAKE receiver preferably uses knowledge of the multi-path delays and channel-impulse values for all detected paths. To achieve a best possible signal-to-noise ratio at an output of the RAKE combiner, signal energy from as many physical paths as possible should be collected. In addition, tracking as many different physical paths as possible (i.e., maximal utilized diversity) significantly improves signal-reception robustness, since the probability of a simultaneous deep fade of all paths is reduced. Simultaneous deep fade of all paths is a phenomenon that typically leads to serious block-error-rate (BLER) degradation.

A propagation channel structure (i.e., absolute and relative delays of the individual multi-path components) does not typically remain constant over time. Due to relative movement of the transmitter, the receiver, and nearby objects, delays of existing paths may change, old paths may disappear, and new paths may appear. In addition, a frequency offset between respective circuits of the transmitter and the receiver gives rise to a clock drift. The clock drift generally manifests itself as a gradual time-axis movement of the entire delay profile. To ensure proper operation of the RAKE receiver, the changing delays of all known multi-path components should be tracked and new paths should be discovered quickly after the new paths appear.

Due to the physical channel structure, in most cases relative positions of the nearby objects change. Thus, path lengths of the new paths usually do not differ significantly from path lengths of the existing paths. The macro-structure of the channel (e.g., mountains or groups of buildings that cause signal reflections) changes relatively rarely. Therefore, most often, the delays of the new paths are relatively similar to those of the existing, known, paths. Therefore, the delays of the new paths may be detected by searching near the known delays of the existing paths.

FIG. 1 is a block diagram of a typical RAKE receiver. A RAKE receiver 100 includes a delay estimator block 102, a channel estimator block 104, and a RAKE despreader/combiner block 106. Received data are fed to the delay estimator block 102. The delay estimator block 102 evaluates an impulse response of a channel over a range of possible delays of the channel. A resulting delay profile, which may be a complex delay profile or a power delay profile, may then be subjected to peak detection and detected peak locations reported to the RAKE despreader/combiner block 106 as delay estimates for the multi-path components. The delay estimates are also used by the channel estimator block 104 to estimate corresponding complex channel coefficients by despreading a pilot sequence and possibly filtering results over time to reduce the effects of noise and interference. Channel parameters are estimated in collaboration between the delay estimator block 102, which determines temporal alignment of a despreader portion of the RAKE despreader/combiner block 106, and the channel estimator block 104, which estimates the complex coefficients to be used by a combiner portion of the RAKE despreader/combiner block 106. A noise-plus-interference power estimate is also made.

A simple approach to delay estimation involves evaluating an impulse response of a channel over an entire range of possible delays (i.e., maximal assumed delay spread) of the channel. A resulting complex delay profile or power delay profile may then be subjected to peak detection and detected peak locations reported by the delay estimator block 102 to the channel estimator block 104 and the RAKE despreader/combiner block 106 as delay estimates. However, processing and power-consumption expenses of frequent execution of a full path-searching routine are usually prohibitive. Therefore, typical implementations may use path searchers with observation windows shorter than the full search area (i.e., the maximal assumed delay spread). In addition, resolution of the path searcher may be reduced and additional densely-sampled windows of despreaders used that produce higher-resolution estimates of certain areas of the power delay profile. In any case, for any practical delay estimation, a path search is periodically undertaken to re-scan the delay range with the purpose of detecting new paths.

A delay-estimation algorithm extracts the path positions and finds the path delays with sufficient accuracy once the path positions are discovered by the path searcher. A path-searcher window is positioned so that new paths are included within the path-searcher window. Since it is known with sufficiently-high probability that the new paths will appear in the vicinity, in terms of the paths' respective delays, of the currently-known paths, the path-searcher window is usually placed so as to cover the currently-known paths.

At time n, a window-positioning algorithm has some information available about locations and powers of the currently-known paths (e.g., tracked path list and/or paths' magnitudes, a recent power-delay-profile estimate from the path searcher, etc . . . ) and can produce an instantaneous window position estimate at time n, which is represented as $\tau^{(n)}$. Since an actual instantaneous window position may depend on a momentary fading state of the channel, as well as on a residual noise-plus-interference realization, it is often not advisable to directly use the instantaneous position estimate. Instead, some form of filtering is typically used to combine a current instantaneous position estimate with past instantaneous-position-estimate values. Combining the current and past instantaneous-position-estimate values significantly reduces effects of noise and avoids unacceptable fluctuations of the instantaneous-position-estimate that can occur due to fading patterns that, for practical path-searcher activation schedules, may be completely independent from one path-searcher activation to the next.

A typical filtering process uses exponential smoothing as an averaging scheme. The average position estimate $\bar{\tau}^{(n)}$ is found as follows:

$$\bar{\tau}^{(n)} = \alpha \bar{\tau}^{(n-1)} + (1-\alpha)\tau^{(n)} \qquad (1)$$

where a forgetting factor $\alpha$ is determined by a desired time constant of the filtering process.

In an environment with little or no fading, the averaging scheme of equation (1) is acceptable and achieves suppression of noise-induced fluctuations with low computational and storage requirements. However, in the presence of fading, it has been observed that the accuracy of the delay estimation suffers. Therefore, a method of and system for path-searcher window positioning that overcomes these and other drawbacks is needed.

SUMMARY OF THE INVENTION

Embodiments of the present invention provide a method of and apparatus for path searcher window positioning. In an embodiment of the present invention, a method of determining an average position estimate includes determining an average signal power of a path-searcher window. The step of determining the average signal power includes using a previously-determined average signal power and an instantaneous signal power. The method also includes determining the average position estimate. The step of determining the average position estimate includes using an instantaneous position estimate, a previously-determined average position estimate, the previously-determined average signal power, and the instantaneous signal power.

In another embodiment of the invention, an apparatus for determining an average position estimate includes a channel estimator, a despreader, and a delay estimator. The delay estimator is interoperably connected to the channel estimator and the despreader. The delay estimator is for determining an average signal power of a path-searcher window and determining the average position estimate. The determination of the average signal power includes using a previously-determined average signal power and an instantaneous signal power. The determination of the average position estimate includes using an instantaneous position estimate, a previously-determined average position estimate, the previously-determined average signal power, and the instantaneous signal power.

BRIEF DESCRIPTION OF THE DRAWINGS

A more complete understanding of exemplary embodiments of the present invention can be achieved by reference to the following Detailed Description of Exemplary Embodiments of the Invention when taken in conjunction with the accompanying Drawings, wherein.

DETAILED DESCRIPTION OF EXEMPLARY EMBODIMENTS OF THE INVENTION

In a non-fading environment, or for values of $\alpha$ close to 1, the averaging scheme of equation (1) is acceptable and achieves suppression of noise-induced fluctuations with low computational and memory-storage requirements. However, in the presence of fading, the signal energy available for position estimation at any given time n varies with the fading, while the expected noise energy remains relatively constant. Thus, the decision conditions are not constant over time. In fact, some decisions may even be dominated by noise. An instantaneous fading pattern determines the distribution of signal energy within a corresponding observation region; however, equation (1) treats all position estimates $\tau^{(n)}$ as equal, and combines all of the position estimates with equal significance, which leads to excessive noise and fluctuations being included in the averaging process.

Embodiments of the invention improve the robustness of detecting new multi-path components in a radio propagation channel by suitably combining instantaneous window position estimates to reliably position a path searcher window for new searches. In accordance with principles of the invention, a path-searcher window position is temporally filtered to track existing paths and detect new paths in a vicinity thereof and effects of the residual noise plus interference and fading-induced variations in a path structure are minimized.

Simultaneously with computing the instantaneous window position, an instantaneous signal power within a window region is recorded. The signal power is filtered in time, using, for example, exponential smoothing, in order to yield an average signal power. The instantaneous position is added to the average position using the instantaneous and average signal powers as respective combining weights. As a result, the channel realizations reflecting only partial path structure or noise-dominated cases are accumulated with relatively low weight, while the full realizations with high signal-to-noise ratios contribute most to the average. In addition, recording the average powers and window positions allows for convenient combination of positions of various disjoint window position estimates via power-weighted summing.

Figure 1:
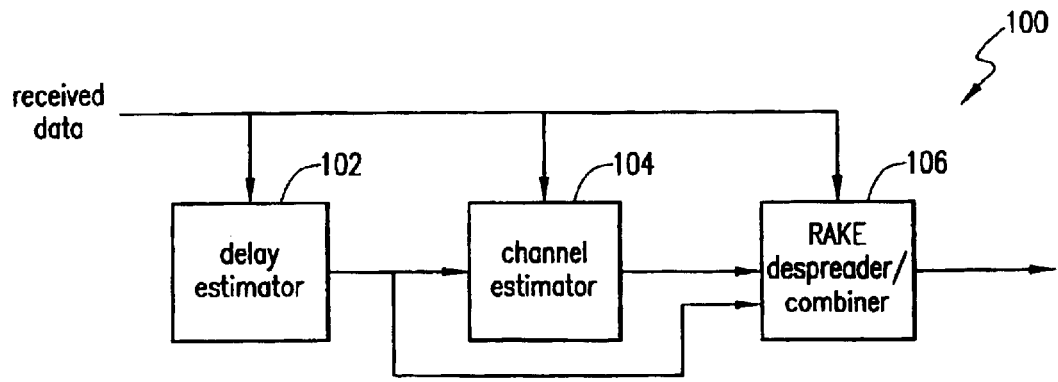
FIG. 1, previously described, is a block diagram of a typical RAKE receiver.
Figure 2:
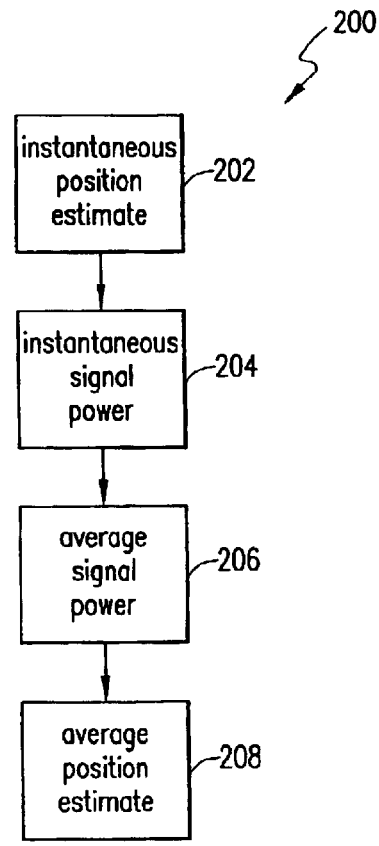
FIG. 2 is a flow diagram that illustrates path-searcher window positioning in accordance with principles of the invention.

Referring again to the FIGURES, FIG. 2 is a flow diagram that illustrates path-searcher window positioning in accordance with principles of the invention. A flow 200 begins at step 202, where an instantaneous window position estimate $\tau^{(n)}$ is made at time n. At step 204, signal power $P^{(n)}$ covered by the window at time n is calculated, preferably by summing power-delay-profile components used for determining the instantaneous window position estimate and subtracting any expected noise component. In some embodiments of the invention, the expected noise component may be estimated by observing a noise floor of the power-delay-profile estimate. At step 206, an average signal power $\overline{P}^{(n)}$ for the path-searcher window is computed. $\overline{P}^{(n)}$ may be computed as:

$$\overline{P}^{(n)} = \alpha \overline{P}^{(n-1)} + (1\alpha) P^{(n)}. \quad (2)$$

A position estimate computed from an instantaneous power delay profile inherently fluctuates due to path-profile fading variations. Even without any residual noise or interference, the instantaneous position estimate may differ significantly from an average position estimate, the average position estimate being the quantity of actual interest. For practical forgetting factors α, an equal-weight smoothing of all sequential instantaneous position estimate values as in equation (1) is sub-optimal, since the contribution to the average value is irrespective of the signal component actually present in the instantaneous power delay profile—an essentially-random position estimate from a deeply-faded, noise-only power delay profile realization will be given significance equal to a position estimate based on a full, well-defined path profile. Therefore, at step 208, an average position estimate is calculated using the instantaneous position estimate, the instantaneous signal power, a previously-calculated average signal power (e.g., at time n−1), and a previously-calculated average position estimate (e.g., at time n−1). The calculation made in step 208 improves the quality of the average position estimate by introducing power-weighting as follows:

$$\overline{\tau}^{(n)} = \frac{\alpha \overline{P}^{(n-1)} \overline{\tau}^{(n-1)} + (1-\alpha) P^{(n)} \tau^{(n)}}{\alpha \overline{P}^{(n-1)} + (1-\alpha) P^{(n)}} \quad (3)$$

A resulting smoothed position estimate from step 208 is based predominantly on position estimates from strong channel realizations, while noise-only and partial profiles are suppressed. Embodiments of the invention use power estimates $P^{(n)}$ that are properly noise-corrected (i.e., contain only the signal energy with mean noise energy equal to zero). Any residual noise component reduces the effectiveness of the power weighting, although, even if a residual noise component were still present, embodiments of the invention would still have substantial benefits over prior approaches.

Embodiments of the invention provide stable window position averaging with improved noise suppression and reduced fluctuation due to fading-related changes in the path profile. In accordance with principles of the invention, random, noise-induced, position estimates during fades have minimal effect on the average position value. Thus, the path-searcher window does not fluctuate during fades and the risk of losing existing regions of activity is significantly reduced.

Embodiments of the invention also result in marginal computational additions compared to prior approaches. The average power computation and slightly more complex weight calculation for position filtering accumulation are added. Given the infrequent computation of the path-searcher window position, the computational premium may be considered negligible.

The embodiment(s) of the invention described above is one of many different possible embodiments. For example, a complex delay profile may be used instead of a power delay profile, in which case the power of each delay profile element is found by multiplying the complex coefficient by its complex conjugate. Principles of the invention are also applicable to different types of instantaneous position estimates, such as, for example, center of gravity, and power-capture-based position decisions. The source data may be, for example, a continuous power-delay-profile estimate, a subset of its peaks, or a list of tracked paths with their magnitudes. While different signal power measures may be used, it is preferable that they are free of bias. A reliable position estimate and a corresponding average power estimate in accordance with principles of the invention is also applicable to a situation in which position estimates for several disjoint observation regions need to be combined (e.g., when conducting extended path search beyond the currently followed regions to detect new clusters of path activity). The average position estimates for the disjoint regions may be combined by using the average powers as combining weights. The resulting position may then be used for positioning the path-searcher window.

Although embodiment(s) of the present invention have been illustrated in the accompanying Drawings and described in the foregoing Detailed Description, it will be understood that the present invention is not limited to the embodiment(s) disclosed, but is capable of numerous rearrangements, modifications, and substitutions without departing from the invention defined by the following claims.

What is claimed is:

1. A method of determining an average position estimate, the method comprising:
    determining an average signal power of a path-searcher window, the step of determining the average signal power comprising using a previously-determined average signal power and an instantaneous signal power; and
    determining the average position estimate, the step of determining the average position estimate comprising using an instantaneous position estimate, a previously-determined average position estimate, the previously-determined average signal power, and the instantaneous signal power.

2. The method of claim 1, wherein the step of determining the average signal power comprises using a forgetting factor.

3. The method of claim 1, wherein the step of determining the average position estimate comprises using a forgetting factor.

4. The method of claim 1, wherein the step of determining the average position estimate comprises:
    weighting the previously-determined average position estimate by a factor related to the previously-determined average signal power; and
    adjusting the previously-determined average position estimate by the instantaneous position estimate weighted by a factor related to the instantaneous signal power.

5. The method of claim 1, wherein a greater value of the present instantaneous signal power results in a greater difference between the average position estimate and the previously-determined position estimate than does a lesser value of the present instantaneous signal power.

6. The method of claim 1, further comprising the steps of:
    determining the instantaneous signal power; and
    determining the instantaneous position estimate.

7. The method of claim 1, wherein:
    the average signal power is represented by $\overline{P}^{(n)} = \alpha \overline{P}^{(n-1)} + (1-\alpha) P^{(n)}$;
    α is a forgetting factor;

$\overline{P}^{(n-1)}$ is the previously-determined average signal power; and $P^{(n)}$ is the present instantaneous signal power.

8. The method of claim 1, wherein:

the average position estimate is represented by $$\overline{\tau}^{(n)} = \frac{\alpha \overline{P}^{(n-1)} \overline{\tau}^{(n-1)} + (1-\alpha) P^{(n)} \tau^{(n)}}{\alpha \overline{P}^{(n-1)} + (1-\alpha) P^{(n)}};$$

$\alpha$ is a forgetting factor;

$\overline{P}^{(n-1)}$ is the previously-determined average signal power;

$P^{(n)}$ is the present instantaneous signal power;

$\tau^{(n)}$ is the instantaneous position estimate; and $\overline{\tau}^{(n-1)}$ is the previously-determined average position estimate.

9. The method of claim 1, wherein the step of determining the average position estimate comprises exponential smoothing and power-weighted summing.

10. The method of claim 1, wherein the present instantaneous signal power is noise-corrected.

11. An apparatus for determining an average position estimate, the apparatus comprising:

a channel estimator;

a despreader; and a delay estimator interoperably connected to the channel estimator and the despreader, the delay estimator for:

determining an average signal power of a path-searcher window, the determination of the average signal power comprising using a previously-determined average signal power and an instantaneous signal power; and determining the average position estimate, the determination of the average position estimate comprising using an instantaneous position estimate, a previously-determined average position estimate, the previously-determined average signal power, and the instantaneous signal power.

12. The apparatus of claim 11, wherein the determination of the average signal power comprises using a forgetting factor.

13. The apparatus of claim 11, wherein the determination of the average position estimate comprises using a forgetting factor.

14. The apparatus of claim 11, wherein the determination of the average position estimate comprises:

weighting the previously-determined average position estimate by a factor related to the previously-determined average signal power; and adjusting the previously-determined average position estimate by the instantaneous position estimate weighted by a factor related to the instantaneous signal power.

15. The apparatus of claim 11, wherein a greater value of the present instantaneous signal power results in a greater difference between the average position estimate and the previously-determined position estimate than does a lesser value of the present instantaneous signal power.

16. The apparatus of claim 11, wherein the delay estimator is further for:

determining the instantaneous signal power; and determining the instantaneous position estimate.

17. The apparatus of claim 11, wherein:

the average signal power is represented by $\overline{P}^{(n)} = \alpha \overline{P}^{(n-1)} + (1-\alpha) P^{(n)}$;

$\alpha$ is a forgetting factor;

$\overline{P}^{(n-1)}$ is the previously-determined average signal power; and $P^{(n)}$ is the present instantaneous signal power.

18. The apparatus of claim 11, wherein:

the average position estimate is represented by $$\overline{\tau}^{(n)} = \frac{\alpha \overline{P}^{(n-1)} \overline{\tau}^{(n-1)} + (1-\alpha) P^{(n)} \tau^{(n)}}{\alpha \overline{P}^{(n-1)} + (1-\alpha) P^{(n)}};$$

$\alpha$ is a forgetting factor;

$\overline{P}^{(n-1)}$ is the previously-determined average signal power;

$P^{(n)}$ is the present instantaneous signal power;

$\tau^{(n)}$ is the instantaneous position estimate; and $\overline{\tau}^{(n-1)}$ is the previously-determined average position estimate.

19. The apparatus of claim 11, wherein the determination of the average position estimate comprises exponential smoothing and power-weighted summing.

20. The apparatus of claim 11, wherein the present instantaneous signal power is noise-corrected.

21. An article of manufacture for determining an average position estimate, the article of manufacture comprising:

at least one computer readable medium; and processor instructions contained on the at least one computer readable medium, the processor instructions configured to be readable from the at least one computer readable medium by at least one processor and thereby cause the at least one processor to operate as to:

determine an average signal power of a path-searcher window, the determination of the average signal power comprising using a previously-determined average signal power and an instantaneous signal power; and determine the average position estimate, the determination of the average position estimate comprising using an instantaneous position estimate, a previously-determined average position estimate, the previously-determined average signal power, and the instantaneous signal power.

* * * * *

UNITED STATES PATENT AND TRADEMARK OFFICE
CERTIFICATE OF CORRECTION

PATENT NO. : 6,917,904 B1
DATED : July 12, 2005
INVENTOR(S) : Andres Reial

It is certified that error appears in the above-identified patent and that said Letters Patent is hereby corrected as shown below:

Column 5,
Line 8, Equation 2, replace " $\overline{p}^{(n)} = \alpha \, \overline{p}^{(n-1)} + (1\alpha)p^{(n)}$ " with -- $\overline{p}^{(n)} = \alpha \, \overline{p}^{(n-1)} + (1-\alpha)p^{(n)}$ --.

Signed and Sealed this

Twenty-seventh Day of September, 2005

JON W. DUDAS
*Director of the United States Patent and Trademark Office*